US007200174B2

(12) United States Patent
Lainema et al.

(10) Patent No.: US 7,200,174 B2
(45) Date of Patent: Apr. 3, 2007

(54) VIDEO CODING SYSTEM

(75) Inventors: Jani Lainema, Irving, TX (US); Marta Karczewicz, Irving, TX (US)

(73) Assignee: Nokia Corporation, Espoo (FI)

( * ) Notice: Subject to any disclaimer, the term of this patent is extended or adjusted under 35 U.S.C. 154(b) by 319 days.

(21) Appl. No.: 10/440,841

(22) Filed: May 19, 2003

(65) Prior Publication Data

US 2003/0202596 A1 Oct. 30, 2003

Related U.S. Application Data

(63) Continuation of application No. 09/488,880, filed on Jan. 21, 2000, now abandoned.

(51) Int. Cl.
*H04B 1/66* (2006.01)
*H04N 7/12* (2006.01)

(52) U.S. Cl. .................................................. 375/240.16

(58) Field of Classification Search ................. 348/699, 348/700, 701, 394.1, 408.1, 407.1, 416.1; 375/240.12, 240.08, 240.16, 240.21, 240.01; *H04N 7/12, 7/26, 7/32*

See application file for complete search history.

(56) References Cited

U.S. PATENT DOCUMENTS 5,608,458 A * 3/1997 Chen et al. ............ 375/240.14
5,929,940 A * 7/1999 Jeannin ...................... 348/699
6,163,575 A * 12/2000 Nieweglowski et al. ..................... 375/240.16
6,212,235 B1 * 4/2001 Nieweglowski et al. ..................... 375/240.08

FOREIGN PATENT DOCUMENTS

EP 0691789 * 6/1995
GB 2317525 * 3/1998

* cited by examiner

*Primary Examiner*—Nhon Diep
(74) *Attorney, Agent, or Firm*—Harrington & Smith, LLP

(57) ABSTRACT

A motion estimation method and system for a video coder are disclosed. The system comprises an input for a video image to be coded. It also comprises a hierarchical series of motion estimators of varying complexity, for estimating a motion vector field between the received image and a reference image. The subsequent motion estimator in the series is selected by a control means if a prediction error associated with the motion vector field estimated by the currently selected motion estimator exceeds a predetermined threshold. When available, inherited and predicted motion information is used to improve prediction quality.

34 Claims, 13 Drawing Sheets

VIDEO CODING SYSTEM

Continuation of prior application Ser. No. 09/488,880 filed Jan. 21, 2000, now abandoned.

The present invention relates to a video coding system. In particular, it relates to a system for the compression of video sequences using motion compensated prediction.

The schematic diagram of a system using motion compensated prediction is shown in FIG. 1 and FIG. 2 of the accompanying drawings. FIG. 1 illustrates an encoder 10 having a motion estimation block and FIG. 2 illustrates a corresponding decoder 30. Motion compensated prediction in such a system is outlined below.

In typical video sequences the change of the content of successive frames is to a great extent the result of motion in the scene. This motion may be due to camera motion or due to motion of the objects present in the scene. Therefore typical video sequences are characterised by significant temporal correlation, which is highest along the trajectory of the motion. Efficient compression of video sequences requires exploitation of this property.

Motion compensated (MC) prediction is a widely recognised compression technique. It utilises the fact that in a typical video sequence, pixel (pel) values in a particular frame can be predicted using pixel values of some other already coded and transmitted frame, given the motion trajectory between these two frames.

A motion compensation system will now be described with reference to FIGS. 1 and 2. The operating principle of motion compensated video coders is to minimise the prediction error $E_n(x,y)$, that is, the difference between the frame being coded $I_n(x,y)$, called the current frame, and a prediction frame $P_n(x,y)$:

$$E_n(x,y)=I_n(x,y)-P_n(x,y) \tag{1}$$

The prediction frame $P_n(x,y)$ is built using pixel values of a reference frame denoted by $R_n(x,y)$ and the motion vectors of pixels between the current frame and the reference frame using the equation:

$$P_n(x,y)=R_n[x+\Delta x(x,y),\ y+\Delta y(x,y)]. \tag{2}$$

The reference frame $R_n(x,y)$ is a frame the information for which has previously been coded and transmitted in order that it may be re-constructed in the decoder. Therefore, it may be a frame preceding the one being coded available in a frame memory of both the encoder 10 and the decoder 30. The pair of values $[\Delta x(x,y), \Delta y(x,y)]$ represents the motion vector of the pixel in location (x,y) in the current frame. $\Delta x(x,y)$ and $\Delta y(x,y)$ are the values of horizontal and vertical displacements of this pixel, respectively. Motion vectors are calculated by a motion field estimation block 12 in the encoder 10. The set of motion vectors of all pixels of the current frame $[\Delta x(.), \Delta y(.)]$ is called the motion vector field and is calculated in a motion field coding block 14 before being used to calculate the prediction frame $P_n(x,y)$ in a motion compensated prediction block 16. The motion vector field is also transmitted to the decoder 30.

A subtractor 18 determines the prediction error $E_n(x,y)$ between the prediction frame $P_n(x,y)$ and the frame being coded $I_n(x,y)$ according to equation 1. Once calculated, the prediction error $E_n(x,y)$ is compressed in a prediction error coding block 20 to produce a compressed prediction error, denoted by $\tilde{E}_n(x,y)$ which is then sent to the decoder 30. The compression process typically introduces some loss of information. Therefore the compressed prediction error $\tilde{E}_n(x,y)$ is decoded in a prediction error decoding block 22 so that it is used to generate a reference frame $R_n(x,y)$ in the encoder 10 which corresponds to the reference frame $R_n(x,y)$ which is generated in the decoder 30. In the encoder 10 this is done by combining the decoded prediction error $\tilde{E}_n(x,y)$ with the prediction frame $P_n(x,y)$ in an adder 24 to produce the reference frame $R_n(x,y)$. The reference frame $R_n(x,y)$ is stored in the frame memory 26 of the encoder 10.

Motion information derived from the motion field coding block 14 and prediction error information derived from the prediction error coding block 20 are combined together in a multiplexing block 28.

In the decoder 30, a demultiplexer 32 separates the prediction error information and the motion information. The prediction error information is provided to a prediction error decoding block 34 and the motion information is provided to a motion compensated prediction block 36. The motion compensated prediction block 36 uses motion information and the reference frame $R_n(x,y)$ stored in the frame memory 38 of the decoder 30 to re-construct the prediction frame $P_n(x,y)$. Pixels of the coded current frame $\tilde{I}_n(x,y)$ are then reconstructed by adding the prediction frame $P_n(x,y)$ to the received prediction error $\tilde{E}_n(x,y)$ in an adder 40, that is:

$$\tilde{I}_n(x,y)=R_n[x+\Delta x(x,y),\ y+\Delta y(x,y)]+\tilde{E}_n(x,y) \tag{3}$$

Due to the very large number of pixels in the frame it is not efficient to transmit a separate motion vector for each pixel. Instead, in most video coding schemes the current frame is divided into larger image segments so that all motion vectors of the segment can be described by fewer coefficients. Depending on the way the current frame is divided into the segments two types of motion compensated coders can be distinguished:

1. Block based coders where the current frame is divided into fixed and a priori known blocks (see FIG. 3*a*), for example 16×16 pixel blocks in codecs according to international standard ISO/IEC MPEG-1 or ITU-T H.261; and
2. Segmentation based (region based) coders where the current frame is divided into arbitrarily shaped segments (see FIG. 3*b*), for example obtained by a segmentation algorithm. For examples refer to Centre de Morphologie Mathematique (CMM), "Segmentation algorithm by multicriteria region merging," Document SIM(95)19, COST 211ter Project Meeting, May 1995 and P. Cicconi and H. Nicolas, "Efficient region-based motion estimation and symmetry oriented segmentation for image sequence coding," *IEEE Transactions on Circuits and Systems for Video Technology,* Vol. 4, No. 3, June 1994, pp. 357–364.

In practice segments include at least a few tens of pixels. In order to represent the motion vectors of these pixels compactly it is desirable that their values are described by a function of a few coefficients. Such a function is called a motion vector field model.

Almost all the motion vector field models commonly used are additive motion models. Motion compensated video coding schemes may define the motion vectors of image segments according to the following general equations:

$$\Delta x(x, y) = \sum_{i=0}^{N-1} a_i f_i(x, y) \tag{4}$$

$$\Delta y(x, y) = \sum_{i=0}^{M-1} b_i g_i(x, y) \tag{5}$$

where coefficients $a_i$ and $b_i$ are called motion coefficients and are transmitted to the decoder. Functions $f_i$ and $g_i$ are called motion field basis functions and are known both to the encoder and decoder.

In order to minimise the amount of information needed in sending the motion coefficients to the decoder, not all motion coefficients for all segments are transmitted. This may be the case, for example, where certain motion coefficients can be omitted without causing significant error. Instead, some of the motion coefficients for some segments are transmitted and others are not transmitted.

Polynomial motion models are a widely used family of motion models. (See, for example H. Nguyen and E. Dubois, "Representation of motion information for image coding," in *Proc. Picture Coding Symposium* '90, Cambridge, Mass., Mar. 26–18, 1990, pp. 841–845 and Centre de Morphologie Mathematique (CMM), "Segmentation algorithm by multicriteria region merging," Document SIM(95)19, COST 211ter Project Meeting, May 1995).

The values of motion vectors are described by functions which are linear combinations of 2-dimensional polynomial functions. The translational motion model is the simplest model and requires only two coefficients to describe motion vectors of each segment. The values of motion vectors are given by the equations:

$$\Delta x(x,y)=a_0$$

$$\Delta y(x,y)=b_0 \tag{6}$$

This model is used in international standards (ISO MPEG-1, MPEG-2, MPEG-4, ITU-T Recommendations H.261 and H.263) to describe motion of 8×8 and 16×16 blocks. Two other widely used models are the affine motion model given by the equation:

$$\Delta x(x,y)=a_0+a_1x+y_1y$$

$$\Delta y(x,y)=b_0+b_1x+b_2y \tag{7}$$

and the quadratic motion model given by the equation:

$$\Delta x(x,y)=a_0+a_0x+a_2y+a_3xy+a_4x^2+a_5y^2$$

$$\Delta y(x,y)=b_0+b_1x+b_2y+b_3xy+b_4x^2+b_5y^2 \tag{8}$$

The affine motion model presents a very convenient trade-off between the number of motion coefficients and prediction performance. It is capable of representing some of the common real-life motion types such as translation, rotation, zoom and shear by only a few coefficients.

The quadratic motion model provides good prediction performance, but it is less popular in coding than the affine model, since it uses more motion coefficients, while the prediction performance is not much better. Furthermore, it is computationally more costly to estimate motion using a quadratic model than it is to estimate affine motion.

The motion estimation block calculates motion vectors $[\Delta x(x,y), \Delta y(x,y)]$ of the pixels of a given segment $S_k$ which minimise some measure of prediction error in the segment. A meaningful additive measure of prediction error has the form:

$$\sum_{(x_i,y_i)\in S_k} p_i h(|I_n(x,y) - R_n(x+\Delta x(x,y), y+\Delta y(x,y))|) \tag{9}$$

where $p_i$ values are scalar constants, |.| denotes absolute value, and h is a non-decreasing function. A very popular measure is the square prediction error, in which case $p_i=1$, and $h(.)=(.)^2$:

$$\sum_{(x_i,y_i)\in S_k} (I_n(x,y) - R_n(x+\Delta x(x,y), y+\Delta y(x,y)))^2 \tag{10}$$

(9) is a highly non-linear function of many variables and there is thus no practical technique which is capable of always finding the absolute minimum of (9) in an acceptable time. Accordingly, motion estimation techniques differ depending on the algorithm for minimisation of the chosen measure of prediction error. (10) is conventionally used as a cost function in motion estimation.

Previously known techniques for motion estimation are discussed below.

One technique is the full search. In this technique the value of the cost function is calculated for all the possible combinations of allowed motion coefficient values (restricted by the range and precision with which motion coefficients can be represented). The values of motion coefficients for which the cost function is minimised are chosen to represent the motion vector field.

The full search technique is usually used only to estimate motion coefficients of the translational motion model and cannot be straightforwardly generalised for other motion models, due to computational burden. In a straightforward generalisation, the computational complexity of the algorithm increases exponentially with the number of motion coefficients used to represent the motion vector field.

Motion estimation using Gauss-Newton iterations (or differential optimisation schemes) is an alternative. These are outlined in H. Sanson, "Region based motion estimation and compensation for digital TV sequence coding," in *Proc. Picture Coding Symposium* '93, Lausanne, Switzerland, Mar. 17–19, 1993 and C. A. Papadoupoulos, and T. G. Clarkson, "Motion Compensation Using Second-Order Geometric Transformations", *IEEE Transactions on Circuits and Systems for Video Technology,* Vol. 5, No. 4, August 1995, pp. 319–331. Such techniques use the well-known Gauss-Newton function minimisation algorithm, to minimise the cost function (9), that is the chosen measure of prediction error, as a function of motion coefficients.

This algorithm assumes that the function to be minimised can be locally approximated by a quadratic function of the arguments. Then, the nth iteration step consists of:

1. computing an approximate quadratic function using first and second derivatives of the actual function using the motion coefficient resulting from (n−1)th step,
2. computing the coefficient vector minimising the approximate function, and assigning the result to the motion coefficient of nth step.

The main problem associated with the Gauss-Newton algorithm is that it converges only towards local minima, unless the initial motion coefficients lie in the attraction domain of the global minimum. Thus it is necessary to provide the Gauss-Newton algorithm with a sufficiently good initial guess of the actual optimum. Two different techniques are usually used to improve the convergence of the Gauss-Newton algorithm:

1. motion estimation using multi-resolution image pyramids,
2. motion estimation using hierarchically increasing levels of the motion model.

The technique of motion estimation using multi-resolution image pyramids is based on the assumption that low-pass filtering the current frame and the reference frame will erase the local minima and help the algorithm to converge to the global minimum. Motion estimation is performed first on the low-pass filtered (smoothed) versions of the reference and current frames, and the result is fed as input to the motion estimation stages using less smoothed images. The final estimation is performed on non-smoothed images. Some variants of this class additionally down-sample the low-pass filtered images, to reduce the number of computations. For examples of this technique, see H. Sanson, "Region based motion estimation and compensation for digital TV sequence coding," in *Proc. Picture Coding Symposium* '93, Lausanne, Switzerland, Mar. 17–19, 1993 and P. J. Burt, "The Pyramid as a Structure for Efficient Computation", in: Multiresolution Image Processing and Analysis, ed. Rosenfeld, Springer Verlag, 1984, pp. 6–35.

However, low-pass filtering of the images does not necessarily erase local minima. Furthermore, this may shift the location of global minimum.

In contrast, the technique of motion estimation using hierarchically increasing levels of the motion model makes use of the following assumptions:

1. A complex motion model can be approximated by a lower order motion model.
2. This approximation is a good initial guess for the iterative search for more complex motion model coefficients.

The most common hierarchy starts with the translational model (2 coefficients), then continues with a simplified linear model (corresponding to the physical motion of translation, rotation and zoom, having 4 coefficients), and ends with the complete linear model (6 coefficients). Such a hierarchy can be seen in P. Cicconi and H. Nicolas, "Efficient region-based motion estimation and symmetry oriented segmentation for image sequence coding," *IEEE Transactions on Circuits and Systems for Video Technology,* Vol. 4, No. 3, June 1994, pp. 357–364 and H. Nicolas and C. Labit, "Region-based motion estimation using deterministic relaxation schemes for image sequence coding," in *Proc.* 1994 *International Conference on Acoustics, Speech and Signal Processing,* pp. III265–268.

These assumptions can work very well under certain conditions. However, convergence to a local minimum is often a problem, especially in the case when the approximation turns out to be a poor one.

Present systems, such as those outlined above, suffer from disadvantages resulting from the relationship between computational complexity and video compression performance. That is, on the one hand, an encoder will require a motion estimation block having high computational complexity in order to determine motion coefficients which minimise the chosen measure of prediction error (9) and thus achieve the appropriate video compression performance. Usually, in this case such a motion estimation block acts as a bottleneck for computational complexity of the overall encoder, due to the huge number of computations required to achieve the solution.

On the other hand, if computational complexity is reduced, this causes a reduction in prediction performance, and thus video compression performance. Since the prediction performance of motion estimation heavily affects the overall compression performance of the encoder, it is crucial for a motion estimation algorithm to have high prediction performance (that is low prediction error) with relatively low complexity.

To keep the complexity low, motion estimation algorithms make assumptions about the image data, motion, and prediction error. The more these assumptions hold statistically, and the stronger the assumptions are, the better the algorithm. Different sets of assumptions usually result in different minimisation techniques.

According to a first aspect of the invention there is provided an encoder for performing motion compensated encoding of a sequence of video frames comprising:

memory means for storing a reference frame; and motion field estimation means for estimating the motion of picture elements in a current frame using at least the reference frame, wherein the motion field estimation means uses prediction motion coefficients previously estimated for a least one picture element of the current frame in the estimation of motion coefficients for at least one other picture element of the current frame.

The invention takes advantage of motion information already available when entering the motion estimation stage. This additional motion information may be predicted from the neighbouring segments or inherited from earlier motion estimations for master segments overlapping with the segment which motion is to be estimated.

Preferably the motion field estimation means calculates motion coefficients for a picture element by using a set of prediction motion coefficients previously estimated for at least one neighbouring picture element. It may use more than one neighbouring picture element. In this case, it can use an averaged set of prediction motion coefficients averaged from motion information previously estimated for more than one neighbouring picture element.

When applied to picture elements, the term "neighbouring" refers to adjacent picture elements in which at least one pixel of one picture element is directly next to at least one pixel of another picture element.

Preferably the encoder comprises segmentation means for segmenting a received frame into a plurality of picture elements. The segmentation means may derive initial motion coefficients for a master picture element.

Preferably the picture elements are segments.

In one embodiment, the encoder comprises two separate motion estimators, one motion estimator for estimating motion coefficients based upon the predicted motion coefficients and one motion estimator for estimating motion coefficients based on the initial motion coefficients. If the prediction motion coefficients and the initial motion coefficients are both available both of the motion estimators may estimate motion coefficients. In this case, selection means in the encoder may select motion coefficients from either motion estimator to be used to code the current frame. However, if only one set of motion coefficients are available and those of the other motion estimator are not available, one motion estimator estimates motion coefficients.

The invention is able to use a combination of the motion estimators having relatively simple motion estimations methods which rely on different assumptions instead of one high complexity method relying on one assumption.

Preferably the encoder determines whether a prediction error associated with motion coefficients estimated by a currently selected method of motion estimation exceeds a predetermined threshold and, if so, it selects a subsequent motion estimation method in a series.

Preferably the encoder comprises a series of motion estimation methods of varying complexity. The series may comprises a hierarchy including a zero motion model, a translational motion model, and an affine motion model.

Preferably the encoder comprises a series of minimisers, including a segment matching minimiser and a Gauss-Newton minimiser and a Quasi-Newton minimiser.

Preferably the invention dynamically switches between statistically valid assumptions varying in strength. In this way it can achieve statistically low prediction error with relatively little complexity.

Preferably the encoder comprises means for sub-sampling the current frame to produce a sub-sampled frame and for forwarding the sub-sampled frame to the series of motion models. The means for sub-sampling may comprise a series of sub-samplers varying in sub-sampling factors.

The encoder may also comprise control means for selecting and using a subsequent motion model in the series if a prediction error associated with the motion vector field estimated by a currently selected motion estimator unit exceeds a predetermined threshold. The control means may be provided to select the amount of sub-sampling during minimisation depending on the change in prediction error.

Preferably the encoder has receiving means for receiving a current frame to be motion coded.

According to a second aspect the invention provides a codec comprising an encoder according to the first aspect of the invention and a decoder.

According to a third aspect the invention provides a mobile terminal comprising an encoder according to the first aspect of the invention.

According to a fourth aspect the invention provides a data communications network comprising an encoder according to the first aspect of the invention.

According to a fifth aspect the invention provides a method for performing motion compensated encoding of a sequence of video frames comprising the steps of:

storing a reference frame;

estimating the motion of picture elements in a current frame using at least the reference frame; and using a set of prediction motion coefficients previously estimated for a least one picture element of the current frame in the estimation of a set of motion coefficients for at least one other picture element of the current frame.

Embodiments of the present invention will now be described, by way of example, with reference to the accompanying drawings, of which:

FIG. 3(*b*) shows the division of the current frame for segmentation based motion compensation;

Figure 4:
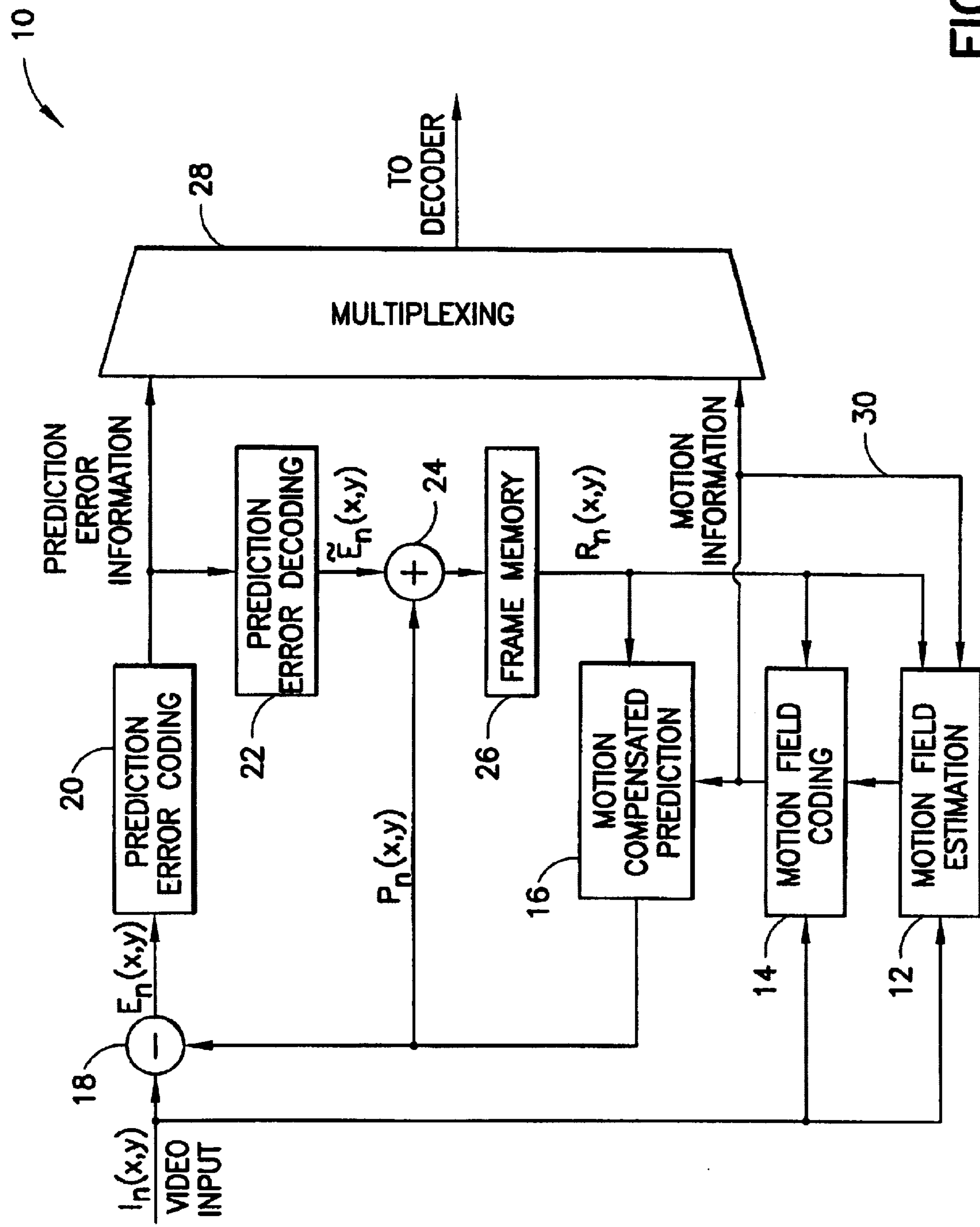
FIG. 4 shows an encoder for motion compensated coding of video frames according to the invention.

An encoder 10 according to the invention is shown in FIG. 4. This figure is similar to FIG. 1 and the preceding description applies. The encoder of FIG. 4 operates in conjunction with a decoder corresponding to that of FIG. 2. FIG. 4 will now be described.

Block-based segmentation in the motion field coding block 14 is used in the embodiment of the invention which will now be described. Final segmentation consists of 16×16 pixel macro-blocks and 8×8 pixel sub-blocks. After estimating motion for a macro-block, the prediction error is analysed in the motion field estimation block 12 and a decision is made in the motion field estimation block 12 whether to split the macro-block into four 8×8 sub-blocks. If splitting takes place, motion coefficients of the macro-block are kept in a motion coefficient memory of the motion field estimation block 12 and used as initial motion coefficients in the 8×8 motion estimation. This is described below. Irrespective of whether splitting takes place, final motion coefficients of the macro-block are output to the motion field coding block 14. The motion field coding block 14 makes the final decisions on the motion model to be transmitted, whether to use a single 16×16 block or four 8×8 blocks to describe this (16×16) macroblock and the coding of the motion coefficients. In this embodiment the same motion estimation system is used independent of the size of the block for which motion is estimated.

Figure 1:
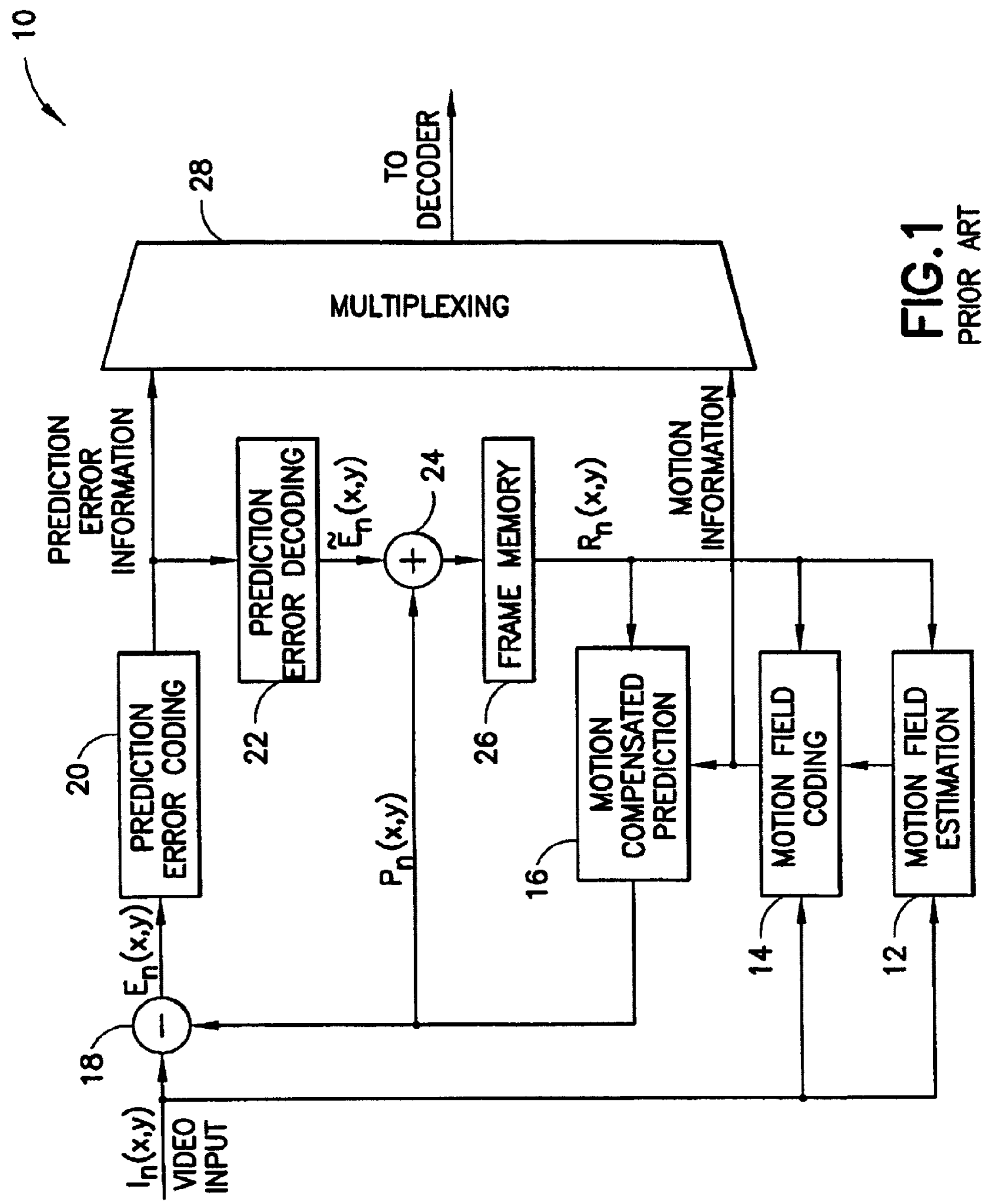
FIG. 1 shows an encoder for the motion compensated coding of video frames.
Figure 2:
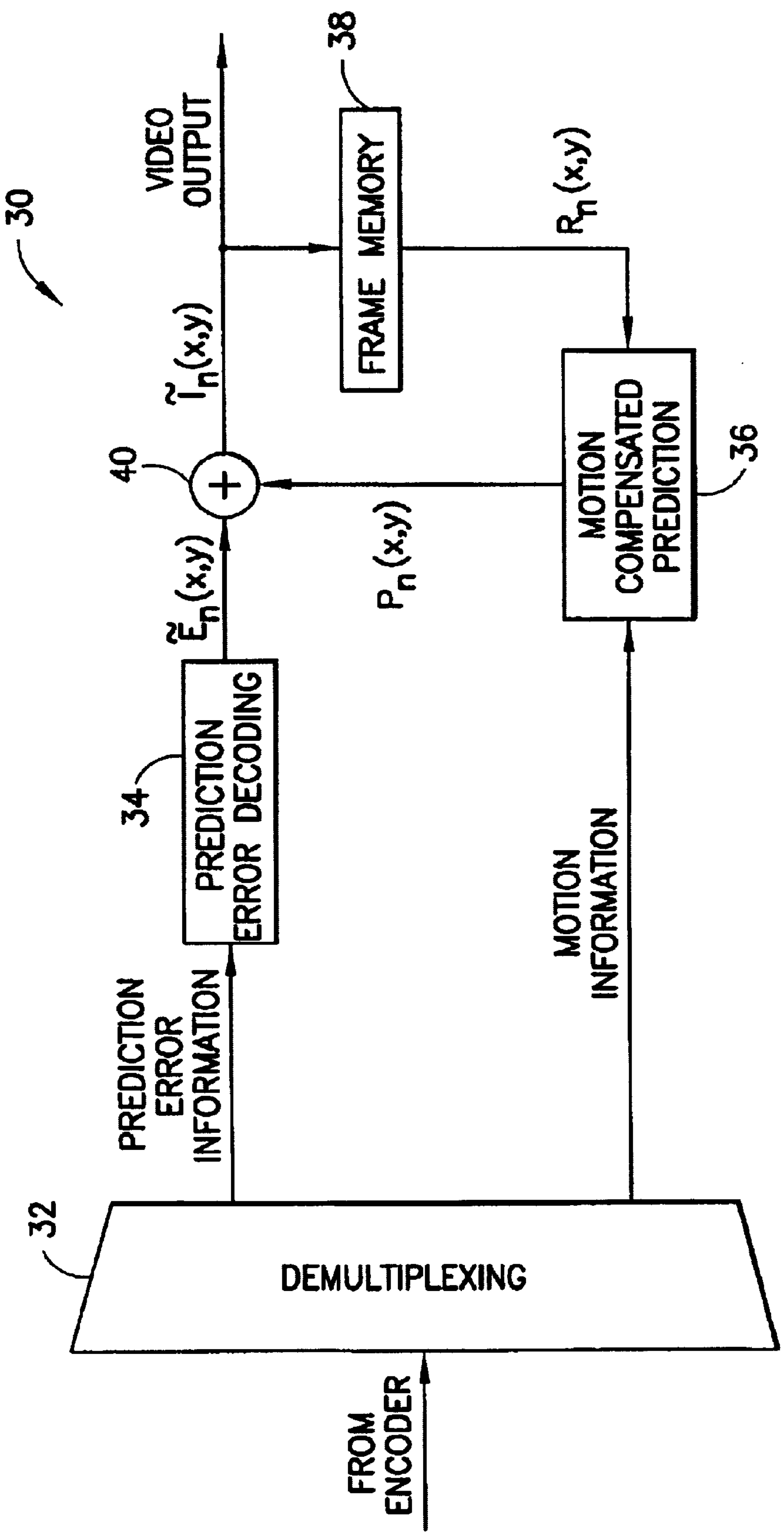
FIG. 2 shows a decoder for the motion compensated coding of video frames.
Figure 3B:
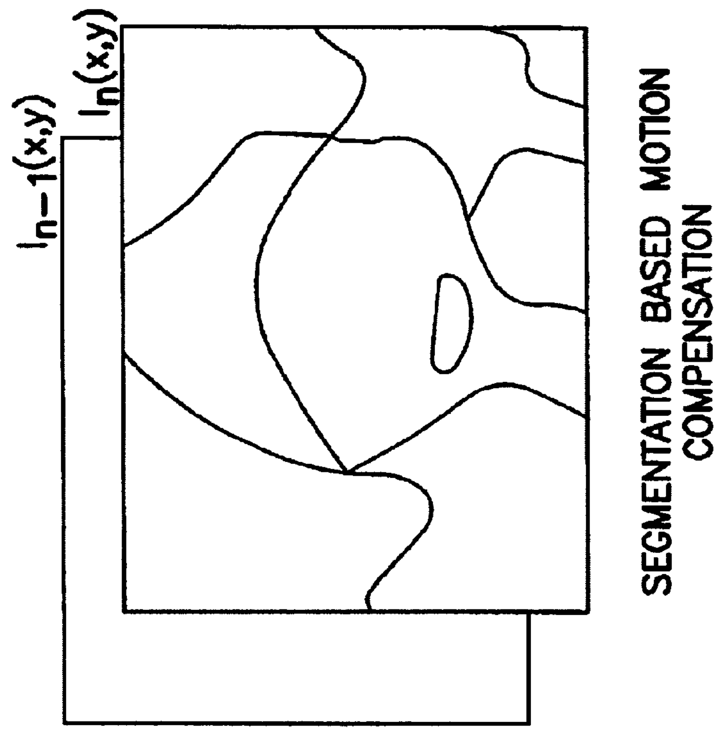
FIG. 3(*a*) shows the division of the current frame for block based motion compensation.
Figure 3A:
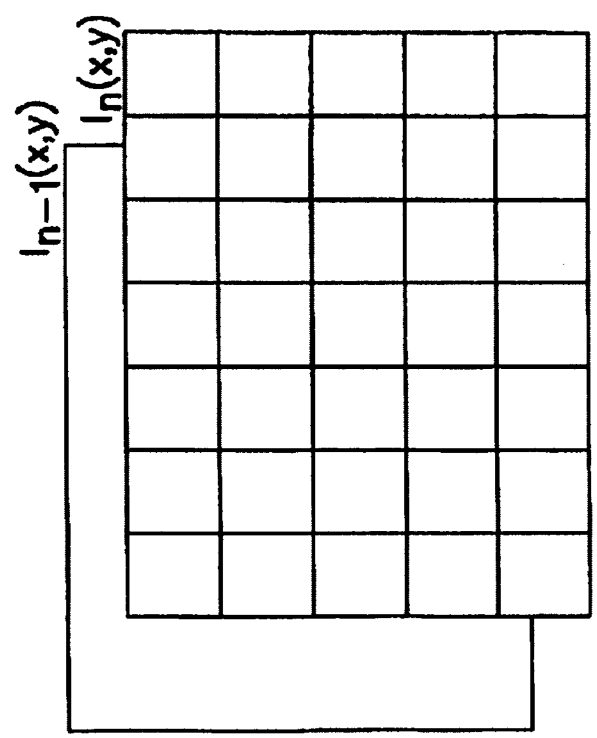

One significant difference between FIG. 1 and FIG. 4 is that motion information produced by the motion field coding block 14 is fed back to the motion field estimation block 12. This motion information comprises both initial motion coefficients and predicted motion coefficients relating to motion of a segment in the current frame relative to a segment in the reference frame. This feedback is represented by numeral 30. Use of the motion information by the motion field estimation block will be described below.

Figure 5:
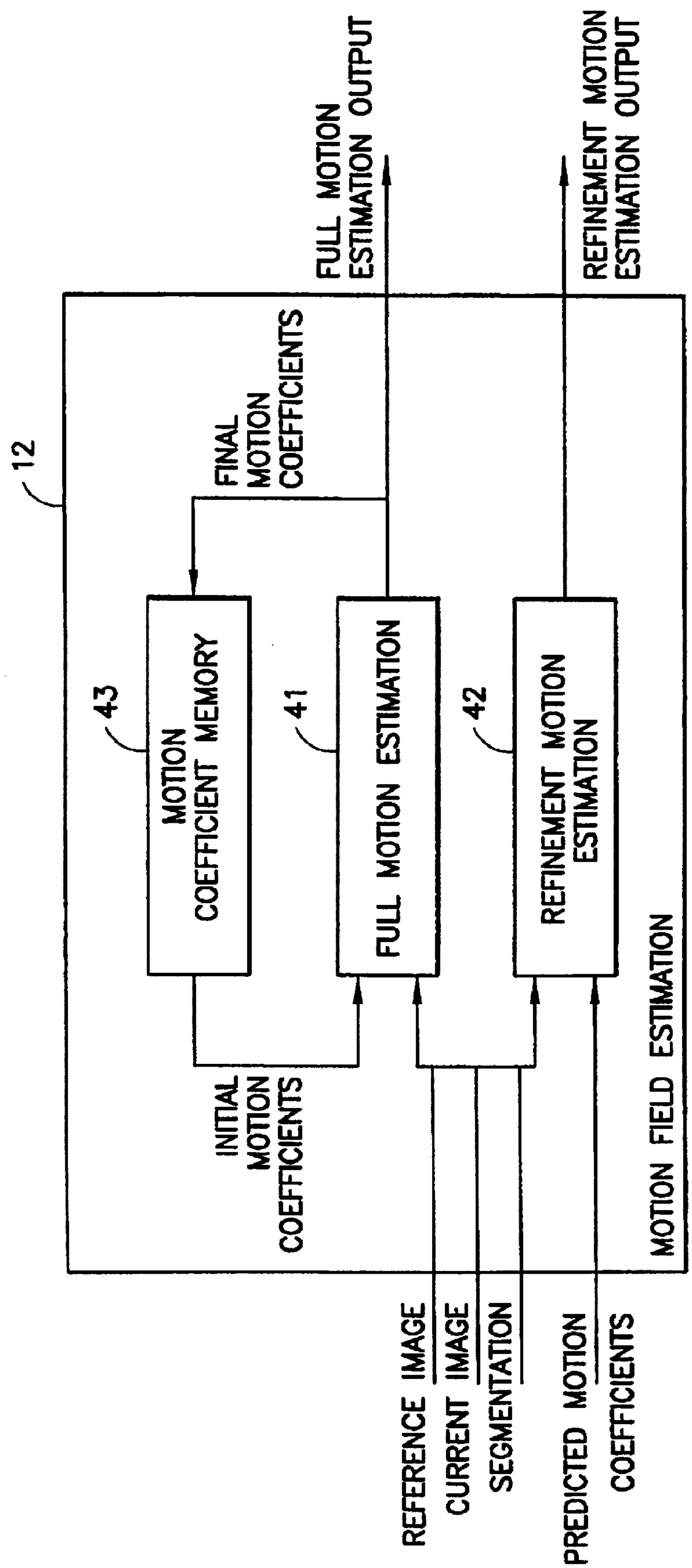
FIG. 5 shows a motion estimation system according to an embodiment of the invention.

The motion field estimation block 12 is shown in FIG. 5. This block comprises two motion estimation blocks, namely a full motion estimation block 41 and a refinement motion estimation block 42 and a motion coefficient memory 43. In order to obtain a good starting point for the 16×16 macroblock motion estimations mentioned above, motion is first estimated for 32×32 pixel block in the full motion estimation block 41. The resulting motion coefficients are stored in the motion coefficient memory 43 and retrieved and used as initial motion coefficients for the segments (16×16 macroblocks or 8×8 sub-blocks) created by splitting a previously estimated block. The full motion estimation block 41 calculates motion coefficients based on the difference between a current frame and an earlier reference frame. However, if initial motion coefficients are available, the full motion estimation block 41 can include these as a basis to calculate motion coefficients for a segment of the current frame. The refinement motion estimation block 42 calculates motion coefficients for a segment of a current frame based on motion coefficients predicted for segment of the current frame which have previously been calculated.

If there are no previously predicted motion coefficients available from the motion field coding block 14 for the motion field estimation block 12 to use as a basis in predicting motion coefficients, only the full motion estimation block 41 is used (using the initial motion coefficients if they are avaible).

If there are previously predicted motion coefficients available from the motion field coding block 14 for the motion field estimation block 12 to use as a basis in predicting motion coefficients, the full motion estimation block 41 and the refinement motion estimation block 42 are used. Operation of the motion estimation blocks is described in greater detail later on with reference to FIGS. 10 and 11.

Figure 6:
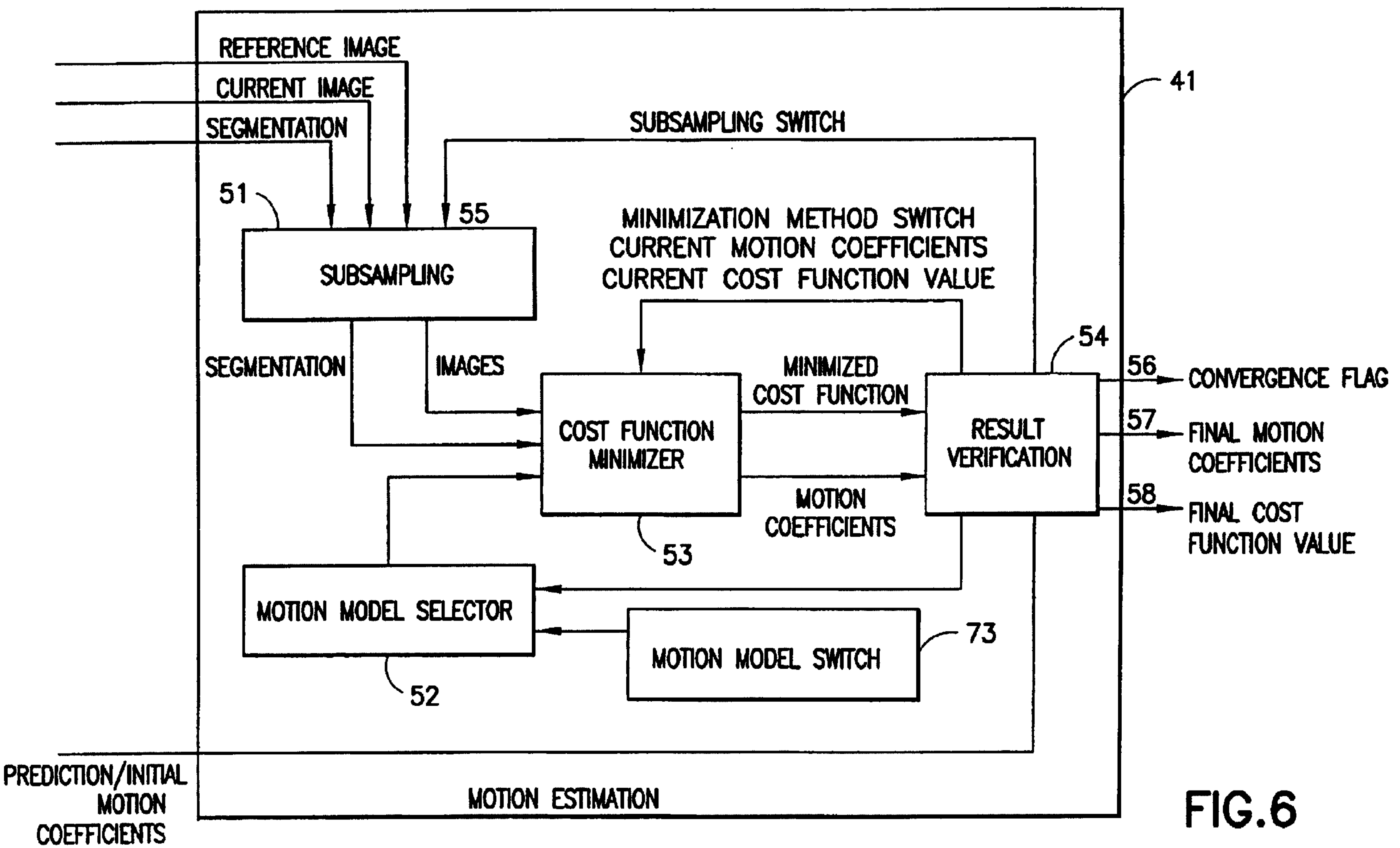
FIG. 6 shows a motion estimation block shown present in the motion estimation system of FIG. 5.

The full motion estimation block 41 and the refinement motion estimation block 42 have a common motion estimation block structure which is shown in FIG. 6. Both motion estimation blocks consist of four main blocks, namely a sub-sampling block 51, a motion model selector block 52, a cost function minimiser block 53 and a result verification block 54. The result verification block 54 produces a number of switch signals to control operation of the other three blocks. Each of these blocks is described below.

The full motion estimation block 41 and the refinement motion estimation block 42 work in steps. At each step, the motion model, the minimisation method used to minimise the cost function value and the sub-sampling factor are determined. This decision is made in the result verification block 54 of the respective motion estimation block.

Figure 7:
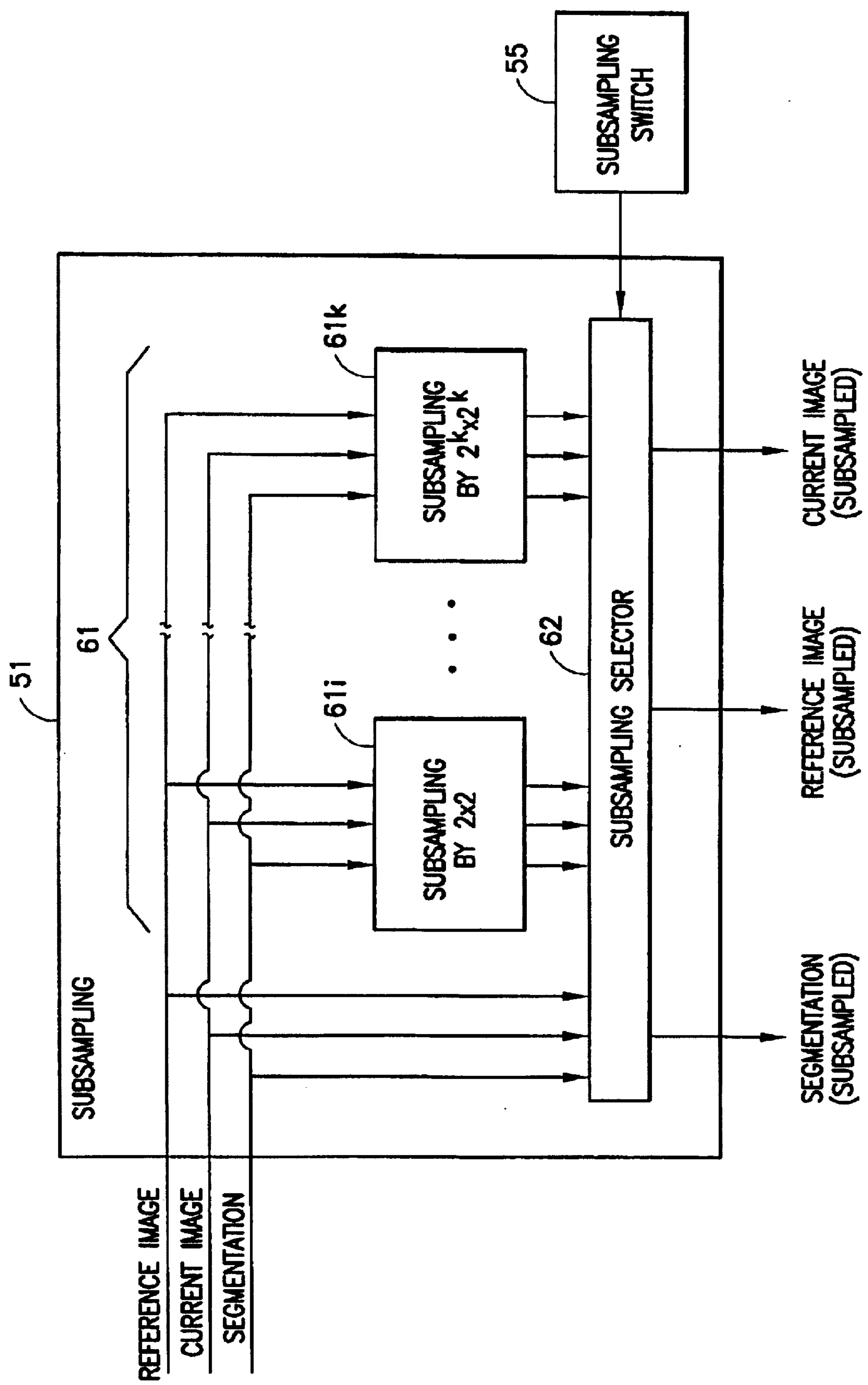
FIG. 7 shows a sub-sampling block present in the motion estimation block of FIG. 6.

FIG. 7 shows a block diagram of the sub-sampling block 51. The inputs to this block are the reference frame $R_n(x,y)$ from the frame memory 26 of the encoder 10, the current frame $I_n(x,y)$, segmentation information from the motion field coding block 14, and information about the required level of sub-sampling. This is provided by a sub-sampling switch 55 which is described below.

The sub-sampling block 51 consists of a bank 61 of sub-samplers 61(1) to 61(k) and a sub-sampling selector 62 in the form of a multiplexer. Each sub-sampler 61(1) to 61(k) (denoted "Sub-sampling by m×m") in the bank 61 sub-samples both the reference image and the current image by taking every mth pixel in both horizontal and vertical directions, where m is an integer power of 2.

The inputs to the sub-sampling selector 62 are the reference $R_n(x,y)$ and current $I_n(x,y)$ frames, segmentation information and their sub-sampled versions at various levels, that is a version which has not been sampled and versions sub-sampled by each of the sub-samplers 61(1) to 61(k). The sub-sampling selector uses the sub-sampling switch update 55 to select an image pair and suitable segmentation to be output. The result verification block 54 is responsible for generating consistent switch signals.

Figure 8:
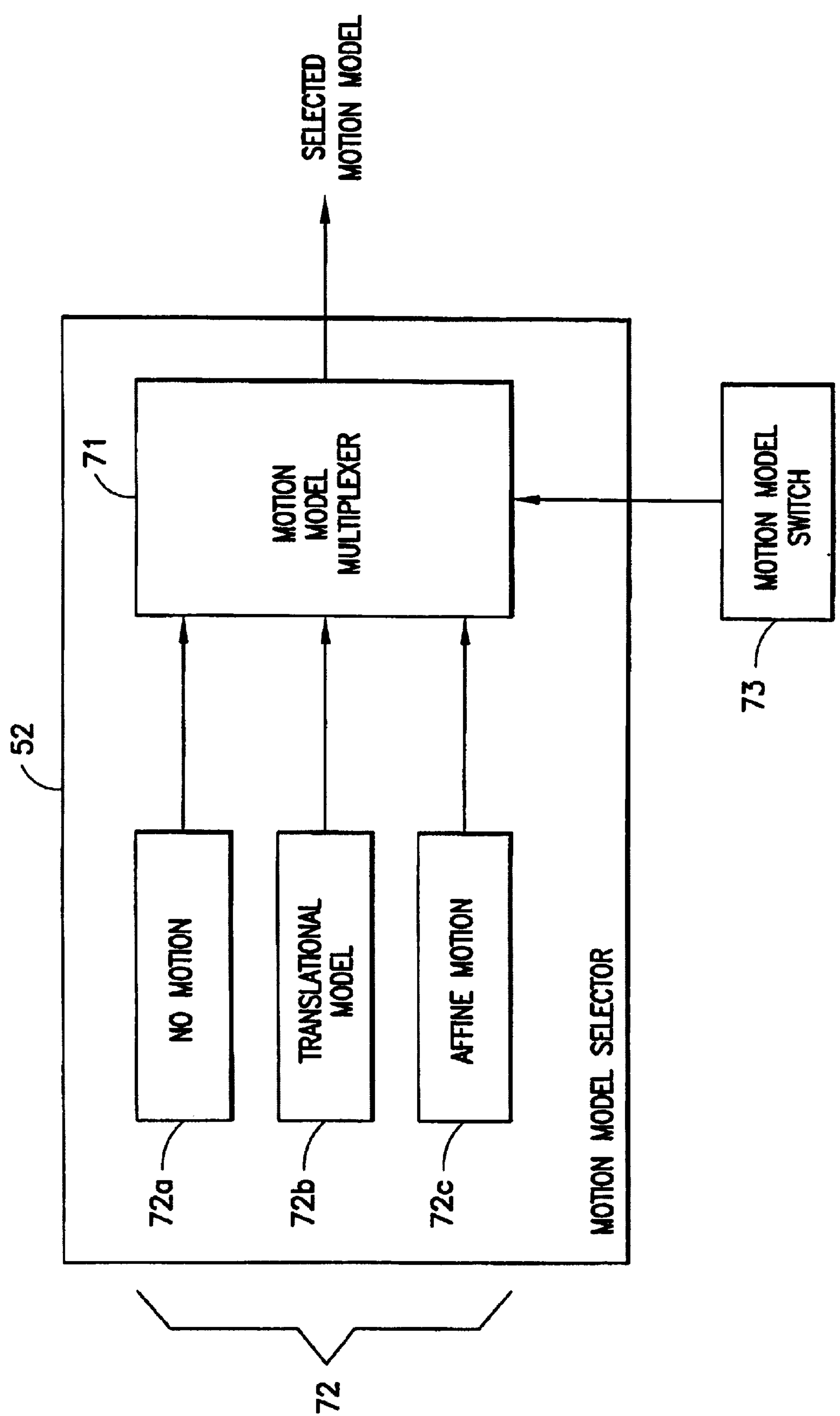
FIG. 8 is a block diagram of the motion model selector present in the motion estimation block of FIG. 6.

FIG. 8 shows a preferred motion model selector block 52. The motion model selector block comprises a motion model multiplexer 71 and a bank 72 of motion models. The motion model selector block 52 receives a motion model switch signal 73 from the result verification block 54.

The motion model selection block 52 is a multiplexer, which makes a selection among the bank 72 of motion models 72*a* to 72*c* depending on the motion model switch signal 73. The motion models in the bank 72 are "No motion", "Translational model" and "Affine model" in order of increasing complexity. The order of complexity refers to the number of basis functions used in representing the motion. There is a close relationship between the order of complexity of the motion model and computational complexity: as the order of complexity of the motion model increases, the computational complexity of estimation of model coefficients increases. As a special case, there is a model "No motion" 72*a* for which all the motion coefficients are set to zero. Other motion models may be used, for example the quadratic motion model. Alternatively, this could be an additionally used model, for example in a block 72*d*.

The motion models 72*a* to 72*c* in the bank 72 have a hierarchy: "No motion" 72*a* can be represented in the translational model and in the affine model by setting all the motion coefficients to zero. Similarly, "translational motion" 72*b* can be fully represented in the affine model by setting $a_1=a_2=b_1=b_2=0$ in (7).

Figure 9:
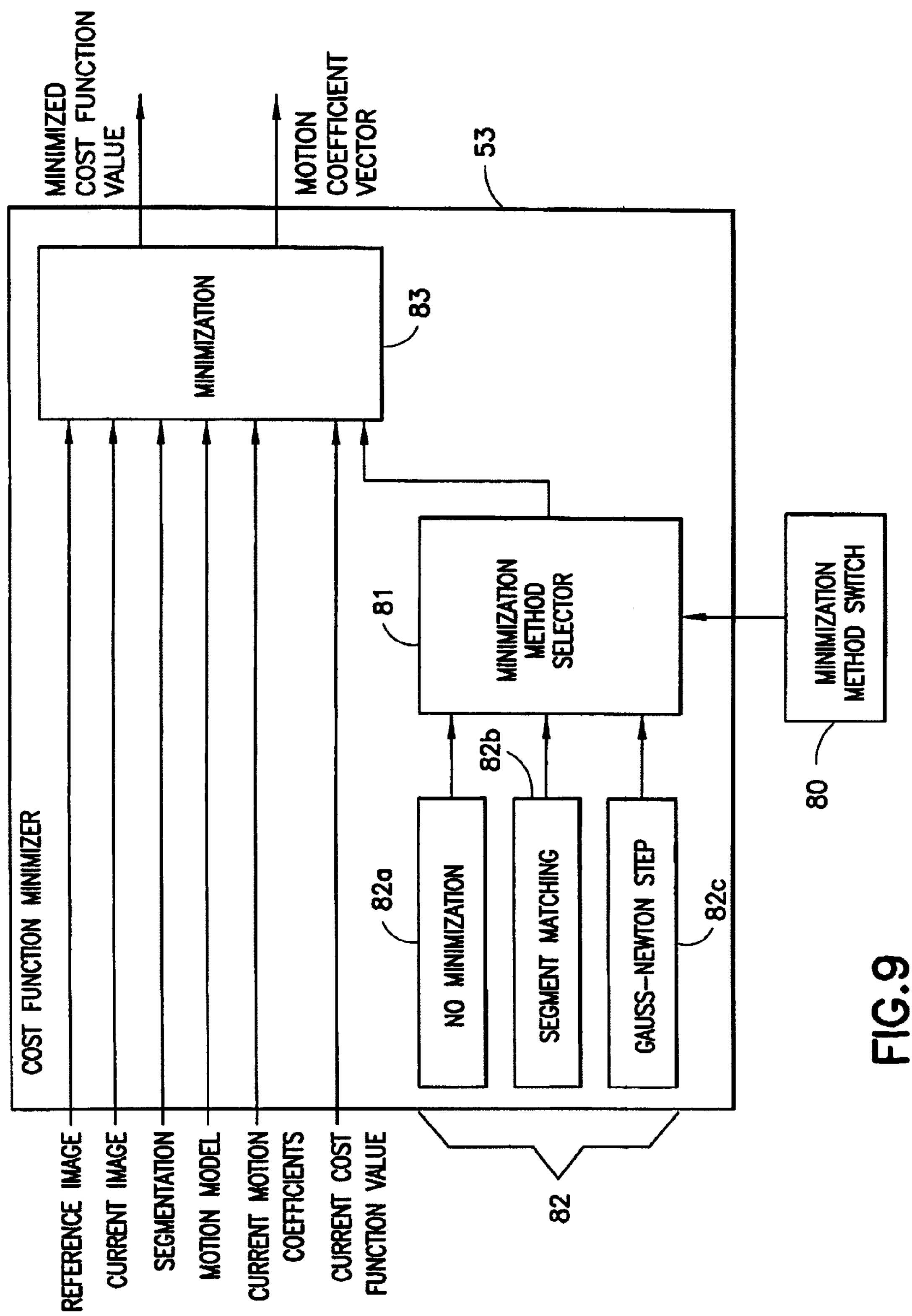
FIG. 9 is a block diagram of the cost function minimiser present in the motion estimation block of FIG. 6.

FIG. 9 shows the block diagram of the cost function minimiser block 53. Minimisation of the cost function is performed in this block. It comprises a minimisation method selector 81, a bank 82 of minimisation methods and a minimisation block 83 which calculates a motion coefficient vector and its associated minimised cost function vector. The minimisation methods comprise "No minimisation" 82*a*, "Segment matching" 82*b* and "Gauss-Newton step" 82*c*. These minimisation methods are further described below.

The inputs to the cost function minimiser block 53 are:

the reference $R_n(x,y)$ and current $I_n(x,y)$ frames and segmentation information from the sub-sampling block 51 (all of which may have been sub-sampled);

a selected motion model from the motion model selector 52; and current motion coefficients, a current cost function value and a minimisation method switch signal 80 from the result verification block 54.

This cost function minimiser block 53 performs minimisation by one of the methods in its bank 82. The selection of the method is determined by a minimisation method switch signal 80 provided by the result verification block 54.

No minimisation can be selected for any motion model. In this case, the cost function minimiser block 53 does not perform any cost function optimisation but simply returns the value of the cost function with motion coefficients inputted. This method is used to evaluate the cost function value in the presence of initial motion parameters.

The segment matching option can be selected only for the translational motion model. The value of the cost function is calculated for the selected set of values of motion coefficients $a_0$ and $b_0$. The values of $a_0$ and $b_0$ which yield the smallest value of the prediction error in (6) are chosen as the solution. The search is performed on a quantized grid, that is, only the scalar quantized values of $a_0$ and $b_0$ are used. The search is made by evaluating some or all of the candidate pairs on the grid, and choosing the pair yielding the smallest cost function value.

The Gauss-Newton step can be used for any motion model except "No Motion". It uses a single Gauss-Newton iteration step to reduce the cost function. (R. Fletcher, "Practical Methods of Optimization", Second Edition, John Wiley & Sons, 1987, Chapter 3 and Chapter 6 gives an overview of Gauss-Newton minimisation).

The Gauss-Newton method is a specific form of Newton's method, commonly used when the cost function to be minimised is a sum of squares.

Newton's method is summarised below.

Let e(a) be the cost function as a function of parameter vector a. Let $a^c$ be the current parameter vector, being input to the minimisation iteration. Then, this cost function can be quadratically approximated around $a^c$ as follows:

$$e(a) \approx e(a^c) + g^T(a-a^c) + \tfrac{1}{2}(a-a^c)^T G(a-a^c) \quad (11)$$

where g denotes the gradient of e with respect to a, at the point $a=a^c$; and G is the approximation of second derivative matrix of e with respect to a at the point $a=a^c$.

Then, the output parameter vector $a^0$ of the minimisation step according to Newton's method is calculated by the equation:

$$a_0 = -G^{-1}g + a^c \quad (12)$$

This is the point at which the quadratic approximation to the cost function around $a^c$ becomes a minimum. If e(a) has the following form:

$$e(a) = \sum_{i=1}^{m} (d_i(a))^2 = d^T d \quad (13)$$

Then, the Gauss-Newton method approximates the second derivative matrix G by:

$$G \approx 2(\nabla d)(\nabla d)^T \quad (14)$$

where $\nabla$d denotes the Jacobian matrix, the columns of which are the first derivative vectors $\nabla d_i$ of the components of d. Considering that the first derivative vector g is given by:

$$g = 2(\nabla d)d \quad (15)$$

the iteration step of the Gauss-Newton method takes the form:

$$a^0 = -[(\nabla d)(\nabla d)^T]^{-1}((\nabla d)d) + a^c \quad (16)$$

In the context of minimisation of prediction error (10), the entries $d_i$ of the vector d are given by:

$$d_i = I_n(x_i, y_i) - R_n(x_i + \Delta x(x_i, y_i), y + \Delta y(x_i, y_i)) \quad (17)$$

The Gauss-Newton method is not very costly computationally, since it performs only one iteration step. The cost function minimiser 53 outputs a minimised cost function value and a motion coefficient vector.

Turning now to the result verification block 54 shown in FIG. 6, this controls the other blocks in the full motion estimation block 41 and the refinement motion estimation block 42 by generating switch signals. These switch signals are the sub-sampling switch 55 (determining the sub-sampling factor to be used in the current iteration), the motion model switch 73 (determining the motion model to be used in the current iteration), and the minimisation method switch 80 (determining the minimisation method to be used in the current iteration). Any combination of switch signals generated by the result verification block 54 has an underlying set of assumptions. The purpose of this result verification block 54 is to optimise these assumptions. Once the set of assumptions is determined, a new set of switch signals is generated and new motion coefficients and a new cost function value result. By comparing these to the previous ones, the result verification block determines:

Whether the new coefficients will be accepted (verified)

Whether the cost function reached an acceptably low value (termination decision)

If iterations will continue, what the next switch signals will be. These switch signals control other blocks in the system. So, determination of the switch signals practically means the decisions about the motion model, minimisation method, and sub-sampling factor to be used in the next iteration(s).

The result verification block 54 keeps the "current motion coefficients", which are the motion coefficients yielding the smallest value of the cost function so far, and a "current cost function value" which is the smallest value of the cost function so far. If iterations are continued, the current motion coefficients and current cost function value are fed to cost function minimiser 53.

Upon convergence of the cost function, that is, when the cost function falls below one of several predefined thresholds, a convergence flag signal 56 is set by the result verification block 54, and then it outputs the convergence flag signal 56 together with the current motion coefficients as "final motion coefficients" 57 and current cost function value as "final cost function value" 58. These outputs are sent to the motion field coding block 14.

The result verification block 54 is a powerful tool for keeping the computational complexity of the system at a minimum. By context-dependent switching between sets of assumptions, that is particular sets of motion models, minimisation methods and degrees of sub-sampling, this block allows high performance motion estimation, involving computationally complex techniques only when necessary.

The system can find motion coefficients of a segment for:

Any arbitrarily shaped segment

Any desired model of the motion field in the segment

Any meaningfully chosen cost function of the prediction error (mean square error, mean absolute error, rate-distortion Lagrangian, etc.).

The system can be implemented in a variety of ways. For example, the following features may vary:

different basis functions can be used in equations (4) and (5), different cost functions can be selected as a measure of prediction error, different methods can be used for segment matching, different variants of Newton's method can be used, different strategies can be used for result verification and method switching.

different methods can be used for sub-pixel evaluation and gradient calculation of the images A preferred embodiment of the invention will now be described.

In a preferred embodiment only one sub-sampler 61 is provided in the sub-sampling block 51. This sub-sampler causes the signal to be sub-sampled by 2×2. The sub-sampling switch signal 55 either chooses this sub-sampler, or no sub-sampling at all.

In this preferred embodiment of the invention there are three motion models in the motion model selector's bank 72: "No motion" model 72*a*, "Translational model" 72*b* and "Affine model" 72*c*.

In the cost function minimiser 53 of this preferred embodiment, the segment matching 82*a* performed is "full-pel segment matching with full search". This operation requires testing all integer-valued motion coefficient pairs in a certain range to find the pair minimising the cost function. With regard to Gauss-Newton minimisation 82*c*, equation (16) can be re-formulated as follows:

$$G\delta = g \quad (18)$$

where $\delta = a^0 - a^c$, $G = (\nabla d)(\nabla d)^T$, $g = -(\nabla d)d$. Equation (18) is solved by Cholesky decomposition (W. H. Press, S. A. Teukolsky, W. T. Vetterling, and B. P. Flannery, "Numerical Recipes in C", Second Edition, Cambridge University Press, 1992, pp. 96–98) and the output motion coefficient vector $a^0$ is computed by $a^0 = a^c + \delta$. In the preferred mode of implementation, the Gauss-Newton step is employed only when the motion model is affine. For this case, G is a 6×6 positive semi-definite symmetric matrix with the following entries:

$$G(m,n)=\sum_{(x_i,y_i)\in S_k} c_m(i)c_n(i) \tag{19}$$

where $c(i)=[dx_i\ y_i dx_i\ x_i dx_i\ dy_i\ y_i dy_i\ x_i dy_i]^T$; $dx_i$ denoting the horizontal image derivative at ith pixel, and $dy_i$ denoting the vertical image derivative at ith pixel. Similarly, g is a vector of size 6 with the entries as follows:

$$g(n)=\sum_{(x_i,y_i)\in S_k} d_i c_n(i) \tag{20}$$

where $d_i$ is as defined in (17).

Cubic convolution interpolation is used for sub-pixel evaluation. Image derivatives are also computed using cubic convolution: the derivatives of the continuous function obtained by cubic convolution interpolation are computed, and they are interpreted as the image derivatives.

The generation of the new switching signals in the result verification blocks of the full motion estimation block 41 and the refinement motion estimation block 42 can be done in a number of ways. Preferred ways for both motion estimation blocks to generate switching signals are described below.

Figure 10A:
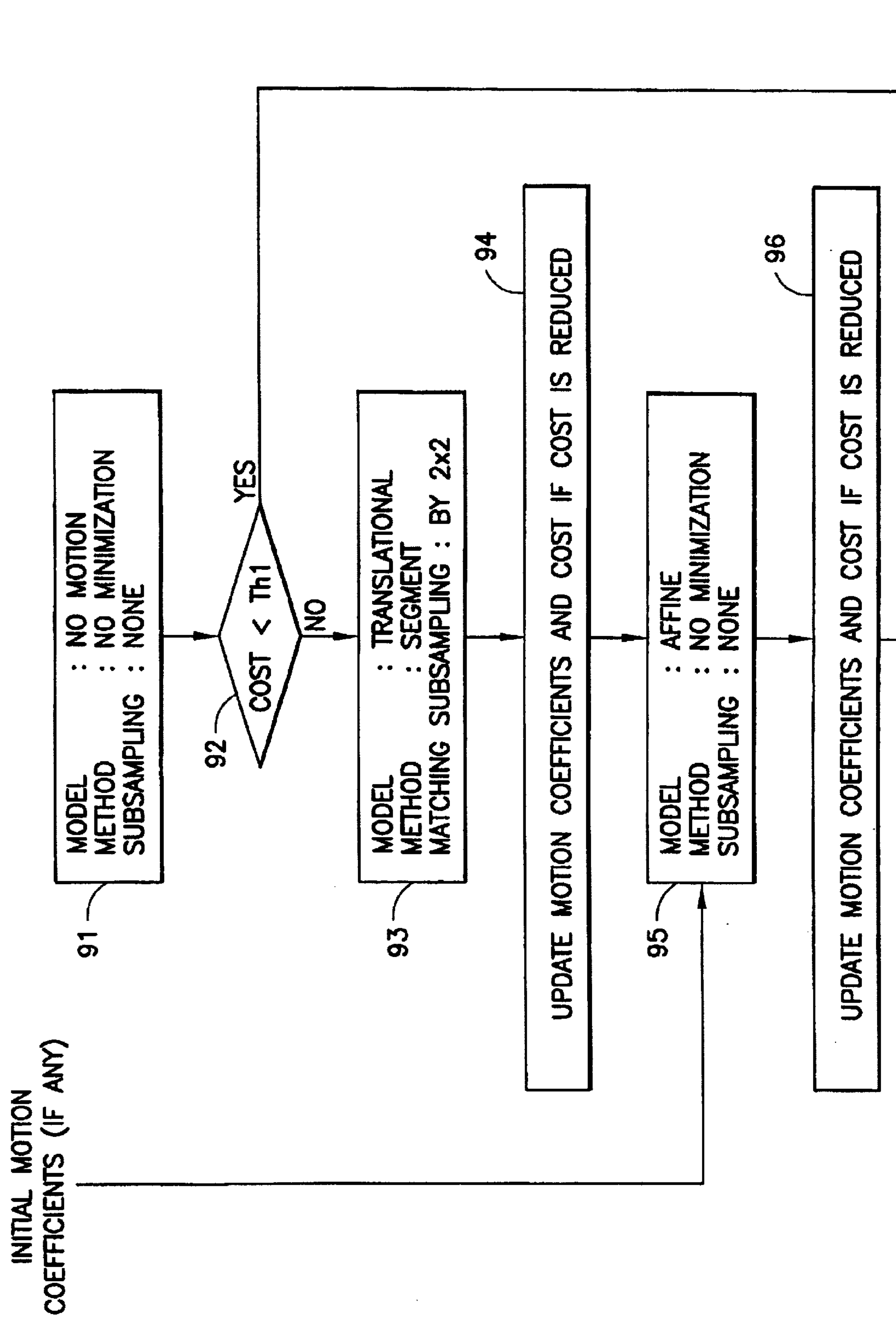
FIG. 10 is a flow diagram of a preferred implementation of the result verification block of a full motion estimation block.
Figure 10B:
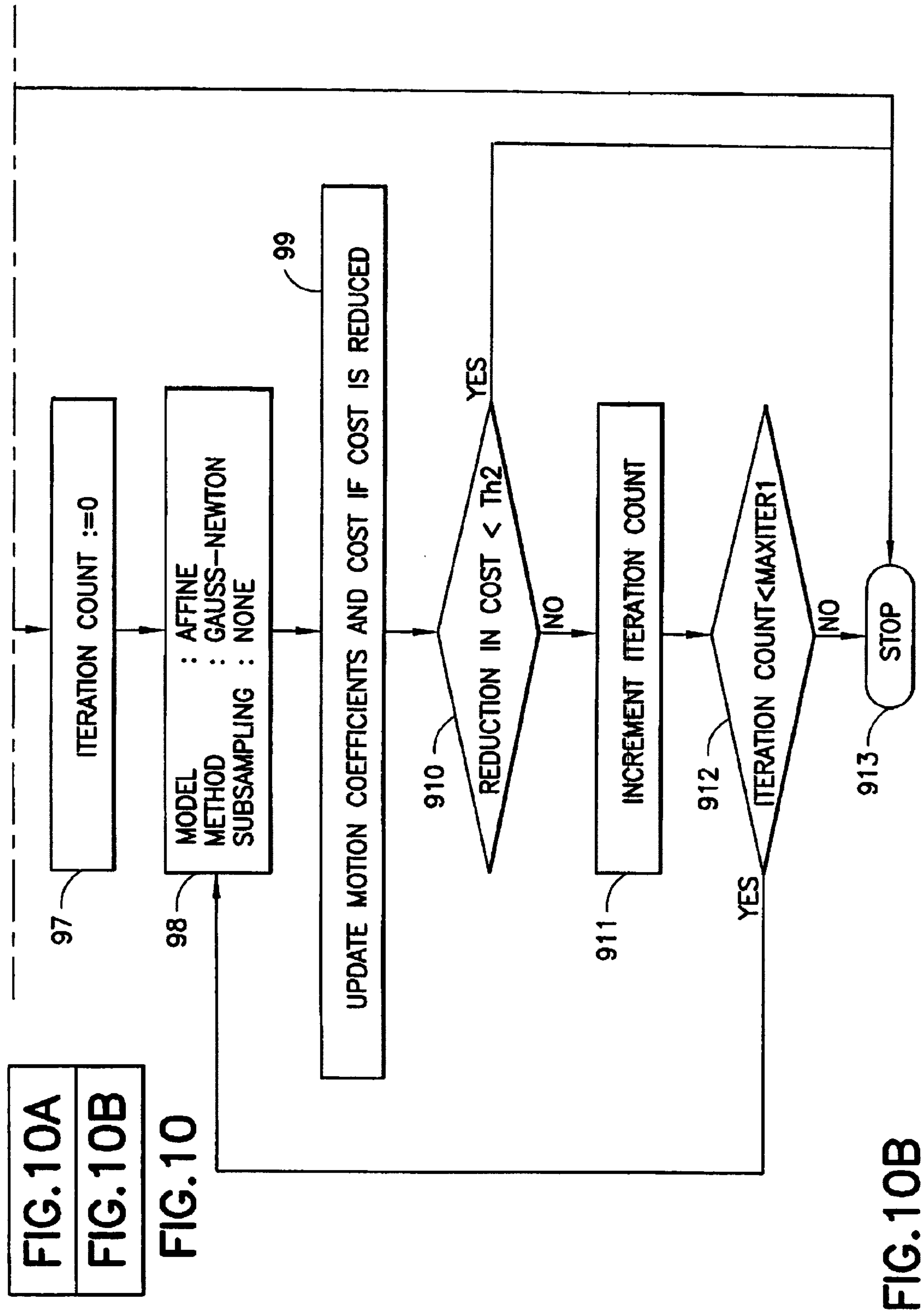

FIG. 10 shows the flow diagram of operations performed in the result verification block 54 of the full motion estimation block 41 according to the preferred embodiment of the invention. A first set of assumption (91) of "No motion" are set by switching the sub-sampling level to "None", the minimisation method is set to "No minimisation" and motion model to "No motion". If the resulting cost function is below a predefined threshold (92) (denoted "Th1" in the Figure), the search is terminated (913) with zero motion coefficients.

If the value of the cost function is larger than or equal to Th1, the next set of assumptions (93) are that a "translational model can approximate the actual motion field" and that "sub-sampling does not shift the global minimum substantially". Following these assumptions, the sub-sampling switch is set to "Sub-sampling by 2×2", the model is switched to "Translational model", and the cost function minimisation method is set to "Segment matching" (93) (sub-sampling is performed to reduce the complexity of operation). If the cost function resulting from this step is below the cost function corresponding to zero-motion, the best-so-far coefficients are updated (94) by setting the values of $a_0$ and $b_0$ in equation 7 to the values computed by segment matching, and setting the other coefficients to zero.

If initial motion coefficients are available, for example from a master segment (and stored in the motion coefficient memory block 43), the next assumption is that an "affine model with initial motion coefficients can approximate the actual motion" (95). Now, the motion model is set to "Affine", "No minimisation" is selected as the minimisation method and the sub-sampling switch 55 is set to "None". Again the cost is evaluated using equation (10) and, if the cost is smaller that the minimum cost of the previous stages (96), initial motion coefficients are stored as the best so far. If there are no initial motion coefficients available, steps 95 and 96 do not occur and step 97 follows step 94.

The next set of assumptions are that an "Affine motion model satisfactorily approximates the motion field", and a "Gauss-Newton step reduces the cost function". Hence, the motion model switch 73 is set to "Affine", the sub-sampling switch 55 to "None", and the minimisation method switch 80 to "Gauss-Newton". With these settings, iterations (98–912) are performed until one of the following occurs:

the reduction in cost function value in the last iteration is below a predefined threshold Th2 (910), a certain number of iteration counts, MaxIter1, is reached (912).

Again, after each iteration, the cost function associated with the outcome of the iteration is compared (99) to the best cost function so far obtained. If the resulting cost function is less than the best-so-far cost function, the motion coefficients and best-so-far cost function value are updated by the outcomes of the iteration.

Figures 11, 11A:
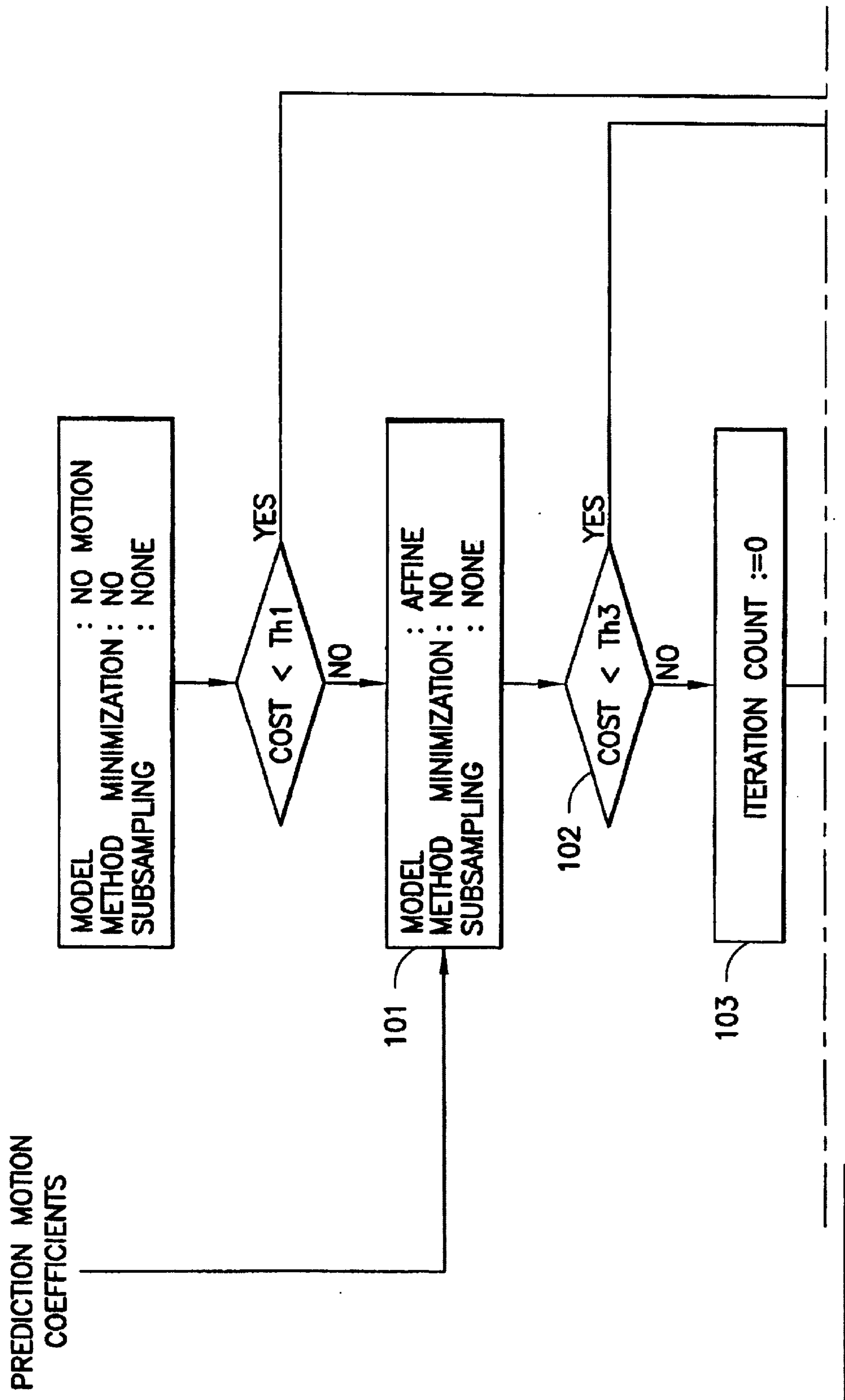
FIG. 11 is a flow diagram of a preferred implementation of the result verification block of a refinement motion estimation block.
Figure 11B:
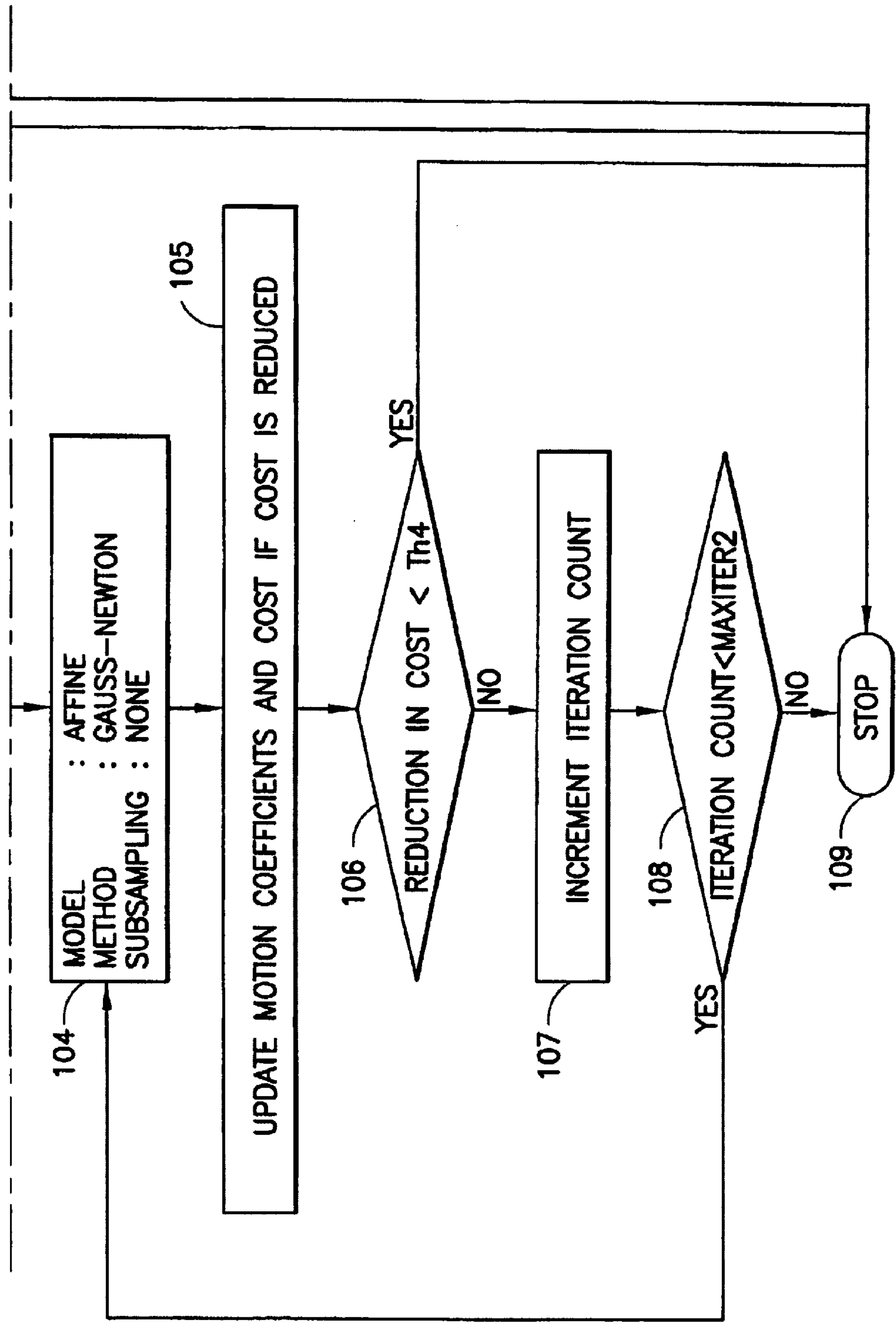

FIG. 11 shows the flow diagram of operations performed in the result verification block 54 of the refinement motion estimation block 42 in the preferred embodiment of the method according to the invention. It can be seen that operations are similar to those performed in FIG. 10. The first assumption is "No motion" and, if the resulting cost function value associated with this assumption is below the predefined threshold Th1 (the same as in FIG. 10), the search is terminated (913) with zero motion coefficients. The second assumption is that "the incoming set of predicted motion coefficients already approximates final motion coefficients 52 reasonably well" (101). An initial cost is evaluated and compared against a predefined threshold Th3 (102). If the cost is below the threshold, the input motion coefficients are outputted as such (109) and sent to the motion field coding block 14. Otherwise a new assumption, "Gauss-Newton Newton step reduces the cost function", is made. The motion model switch is set to "Affine", the sub-sampling switch is set to "None" and the minimisation method to "Gauss-Newton" (104). As in the result verification block 54 of the full motion estimation block 41, the cost function is evaluated after each step and resulting motion coefficients are stored together with the cost if the cost is reduced (105). There are again two conditions in which iterations are terminated:

the reduction in cost function value in the last iteration is below a predefined threshold Th4 (106), a certain number of iteration counts, Maxiter2, is reached (108).

If both the full motion estimation block 41 and the refinement motion estimation block 42 are operational (that is if both initial motion coefficients and predicted motion coefficients are available), then, upon receipt of the outputs of these blocks, the motion field coding block 14 compares the "final cost function values" in order to choose one set of motion coefficients to be used. A suitable way of comparing these motion coefficients is described in co-pending U.S. patent application Ser. No. 10/488,880 filed Jan. 21, 2000.

The predefined thresholds may differ, at different stages of minimisation and/or for different models and/or for different bitrates.

As outlined above, the system for motion estimation according to the present invention achieves motion estimation with significantly less prediction error than that of previous solutions, while keeping the computational complexity at a statistically low level. This is achieved by the arrangement enabling dynamic switching between statistically valid assumptions varying in strength, via assumption verification at each iteration.

Further, the present invention specifically provides an improved system for motion estimation of an image segment, using a polynomial motion vector field model. Motion estimation is an element of video coding using motion compensated prediction. The system finds motion coefficients which yield lower prediction error than prior art solutions, while keeping the computational complexity low. This low prediction error enables better performance in terms of video compression. The low prediction error is achieved by incorporating the general characteristics of image data and motion into a combination of well-known function minimisation techniques.

From the foregoing description it will be evident to a person skilled in the art that various modifications can be made within the scope of the claims.

What is claimed is:

1. An encoder for performing motion compensated encoding of a sequence of video frames having picture elements, the encoder comprising:

a memory for storing a reference frame;

a motion field estimation block arranged to refine a set of prediction motion coefficients, previously estimated for an at least one first picture element of a current frame, by using a series of motion estimation methods of varying complexity to generate a first candidate set of motion coefficients for a second picture element of the current frame, and arranged to select either a set of initial motion coefficients or motion coefficients estimated using the reference frame as a selected set of motion coefficients, and to refine the set of selected motion coefficients by using a series of motion estimation methods of varying complexity to generate a second candidate set of motion coefficients for the at least one second picture element of the current frame; and a motion field coding block for comparing the first candidate set of motion coefficients and the second candidate set of motion coefficients in order to choose one set of motion coefficients to be used to represent motion of the second picture element.

2. An encoder according to claim 1, wherein a refinement motion field estimation block is arranged to generate the first candidate set of motion coefficients by using a series of motion estimation methods of varying complexity and a full motion field estimation block is arranged to generate the second candidate set of motion coefficients by using a series of motion estimation methods of varying complexity.

3. An encoder according to claim 2, wherein the refinement motion field estimation block is arranged to generate the first candidate set of motion coefficients and an associated measure of prediction error and the full motion field estimation block is arranged to generate the second candidate set of motion coefficients and an associated measure of prediction error.

4. An encoder according to claim 3, wherein the motion field coding block is arranged to compare the measure of prediction error associated with the first candidate set of motion coefficients and the measure of prediction error associated with the second candidate set of motion coefficients in order to choose the one set of motion coefficients to be used to represent motion of the second picture element.

5. An encoder according to claim 1, wherein the motion field estimation block inherits the set of initial motion coefficients from motion estimation performed previously for a master segment overlapping the current segment.

6. An encoder according to claim 1, wherein the set of prediction motion coefficients refined by the motion field estimation block is a set of motion coefficients previously estimated for at least one picture element neighbouring the second picture element.

7. An encoder according to claim 1, wherein the set of prediction motion coefficients refined by the motion field estimation block is a set of motion coefficients calculated by using a set of motion coefficients previously estimated for more than one picture element neighbouring the second picture element.

8. An encoder according to claim 1, wherein the set of prediction motion coefficients refined by the motion field estimation block is a set of motion coefficients averaged from motion information previously estimated for more than one picture element neighbouring the second picture element.

9. An encoder according to claim 1, further comprising segmentation means for segmenting a video frame into picture elements.

10. A method according to claim 1, wherein if a set of prediction motion coefficients is not available the motion field coding block is arranged to choose the second candidate set of motion coefficients as the one set of motion coefficients to be used to represent the motion of the second picture element.

11. An encoder according to claim 1, wherein if a set of initial coefficients is not available, the motion field estimation block is arranged to select a set of motion coefficients estimated using the reference frame as the selected set of motion coefficients.

12. An encoder according to claim 1, wherein the motion field estimation block is arranged to refine respectively the set of prediction motion coefficients and the selected set of motion coefficients in steps and to choose a motion model, and a minimisation method for minimising the measure of prediction error.

13. An encoder according to claim 1, wherein the motion field estimation block is arranged to select a subsequent motion estimation method in the series of motion methods if the measure of prediction error obtained by using a currently selected motion estimation method exceeds a predetermined threshold.

14. An encoder according to claim 1, wherein the series of motion estimation methods used by the motion field estimation block to refine the set of prediction motion coefficients comprises a hierarchy of motion models of different complexities.

15. An encoder according to claim 14, wherein the hierarchy of motion models comprises a zero motion model, a translational motion model and an affine motion model.

16. An encoder according to claim 1, wherein the measure of prediction error is any one of the following: a mean square prediction error, a mean absolute prediction error, and a rate-distortion Lagrangian.

17. A codec comprising an encoder according to claim 1 and a decoder.

18. A mobile terminal comprising an encoder according to claim 1.

19. A data communications network comprising an encoder according to claim 1.

20. A method for performing motion compensated encoding of a sequence of video frames having picture elements, the method comprising the steps of:

storing a reference frame;

when a set of prediction motion coefficients previously estimated for an at least one first picture element of a current frame is available, refining the set of prediction motion coefficients by using a series of motion estimation methods of varying complexity to generate a first candidate set of motion coefficients for a second picture element of the current frame;

selecting either a set of initial motion coefficients or motion coeffIcients estimated using the reference frame as a selected set of motion coefficients, refining the set of selected motion coefficients by using a series of motion estimation methods of varying complexity to generate a second candidate set of motion coefficients for the second picture element of the current frame; and comparing the first candidate set of motion coefficients and the second candidate set of motion coefficients in order to choose one set of motion coefficients to be used to represent motion of the second picture element.

21. A method according to claim 20, wherein the first candidate set of motion coefficients and an associated measure of prediction error and the second candidate set of motion coefficients and an associated measure of predicLion error is generated.

22. An method according to claim 21, wherein the measure of prediction error associated with the first candidate set of motion coefficients is compared with the measure of prediction error associated with the second candidate set of motion coefficients in order to choose the one set of motion coefficients to be used to represent motion of the second picture element.

23. A method according to claim 20, wherein the set of initial motion coefficients is inherited from motion estimation performed previously for a master segment overlapping the current segment.

24. A method according to claim 20, wherein the set of prediction motion coefficients is a set of motion coefficients previously estimated for at least one picture element neighbouring the second picture element.

25. A method according to claim 20, wherein the set of prediction motion coefficients is a set of motion coefficients calculated by using a set of motion coefficients previously estimated for more than one picture of element neighbouring the second picture element.

26. A method according to claim 20, wherein the set of prediction motion coefficients is a set of motion coefficients averaged from motion information previously estimated for more than one picture element neighbouring the second picture element.

27. A method according to claim 20, wherein once the one set of motion coefficients to be used to represent the motion of the second picture element has been chosen, steps 2, 3 and 4 are repeated for another picture element of the current frame.

28. A method according to claim 20, wherein if a set of prediction motion coefficients is not available, steps 2 and 4 are not performed and the second candidate set of motion coefficients is chosen as the one set of motion coefficients to be used to represent the motion of the second picture element.

29. A method according to claim 20, wherein if a set of initial coefficients is not available, operation 3 comprises selecting a set of motion coefficients estimated using the reference frame as the selected set of motion coefficients, refining the set of selected motion coefficients by using a series of motion estimation methods of varying complexity to generate the second candidate set of motion coefficients and an associated measure of prediction error for the second picture element of the current frame.

30. A method according to claim 20, wherein refinement of the set of prediction motion coefficients in step 2 and refinement of the set of selected motion coefficients in step 3 is performed in steps and at each step of refinement a motion model and a minimisation method for minimising the measure of prediction error.

31. A method according to claim 20, wherein a subsequent motion estimation method in the series of motion methods used in step 2 to refine the set of prediction motion coefficients is selected for use if the measure of prediction error obtained by using a currently selected motion estimation method exceeds a predetermined threshold.

32. A method according to claim 20, wherein a subsequent motion estimation method in the series of motion methods used in step 3 to refine the set of selected motion coefficients is selected for use if the measure of prediction error obtained by using a currently selected motion estimation method exceeds a predetermined threshold.

33. A method according to claim 20, wherein the series of motion estimation methods used in step 2 to refine the set of prediction motion coefficients and the series of motion estimation methods used in step 3 to refine the set of selected motion coefficients comprise a hierarchy of motion models of different complexities.

34. A method according to claim 20, wherein the measure of prediction error is any one of the following: a mean square prediction error, a mean absolute prediction error, and a rate-distortion Lagrangian.

* * * * *

UNITED STATES PATENT AND TRADEMARK OFFICE

CERTIFICATE OF CORRECTION

PATENT NO. : 7,200,174 B2
APPLICATION NO. : 10/440841
DATED : November 21, 2006
INVENTOR(S) : Lainema et al.

It is certified that error appears in the above-identified patent and that said Letters Patent is hereby corrected as shown below:

Column 17 line 13, delete "predicLion" and insert --prediction--.

Column 17, line 33, after "picture" delete "of".

Signed and Sealed this

Nineteenth Day of June, 2007

JON W. DUDAS
*Director of the United States Patent and Trademark Office*

UNITED STATES PATENT AND TRADEMARK OFFICE

CERTIFICATE OF CORRECTION

PATENT NO. : 7,200,174 B2
APPLICATION NO. : 10/440841
DATED : April 3, 2007
INVENTOR(S) : Lainema et al.

It is certified that error appears in the above-identified patent and that said Letters Patent is hereby corrected as shown below:

Column 17 line 13, delete "predicLion" and insert --prediction--.

Column 17, line 33, after "picture" delete "of".

This certificate supersedes Certificate of Correction issued June 19, 2007.

Signed and Sealed this

Tenth Day of July, 2007

JON W. DUDAS
*Director of the United States Patent and Trademark Office*